Figure 1:
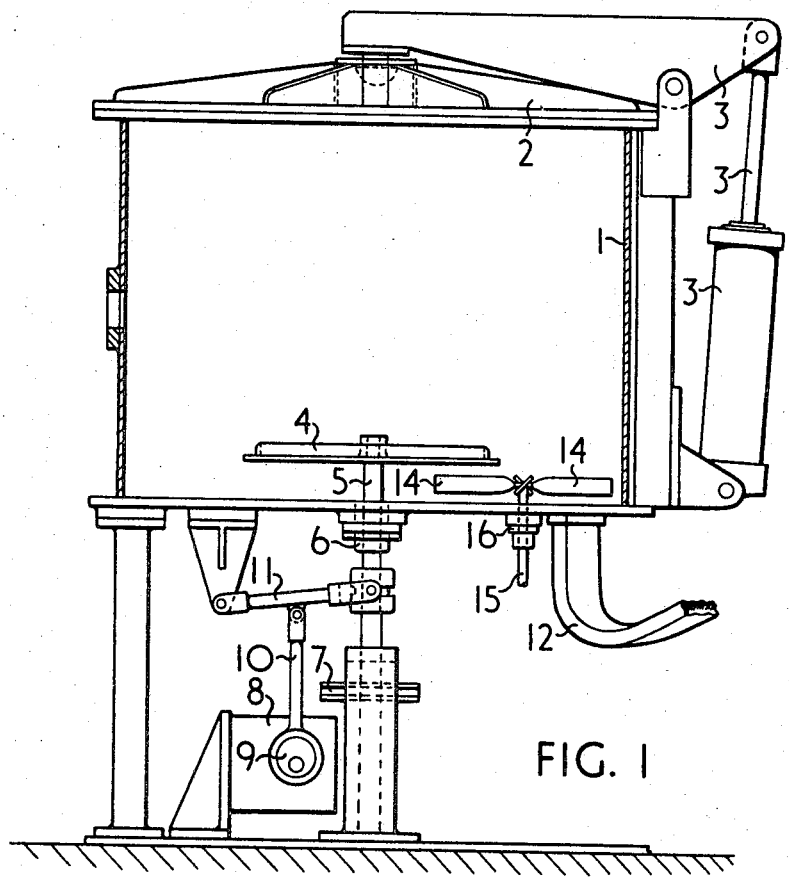

United States Patent

[11] 3,566,066

| [72] | Inventors | John B. Borthwick<br>Erdington;<br>Eric H. Searle, Sutton Coldfield, England |
|---|---|---|
| [21] | Appl. No. | 850,890 |
| [22] | Filed | Aug. 18, 1969 |
| [45] | Patented | Feb. 23, 1971 |
| [73] | Assignee | The Dunlop Company Limited<br>London, England |
| [32] | Priority | Aug. 30, 1968 |
| [33] | | Great Britain |
| [31] | | 41507/68 |

[54] APPARATUS FOR HEATING ARTICLES
11 Claims, 2 Drawing Figs.

[52] U.S. Cl. .................................................. 219/10.55,
219/10.75, 219/10.73
[51] Int. Cl. ..................................................... H05b 9/06,
H05b 5/00
[50] Field of Search .......................................... 219/10.55

[56] References Cited
UNITED STATES PATENTS
2,495,170   1/1950   Kinn................................ 219/10.55X

| 2,738,406 | 3/1956 | Zaleski......................... | 219/10.55 |
| 2,961,520 | 11/1960 | Long............................. | 219/10.55 |
| 3,102,181 | 8/1963 | Verstraten.................... | 219/10.55 |
| 3,182,166 | 5/1965 | Bohm et al.................... | 219/10.55 |
| 3,436,506 | 4/1969 | Smith............................ | 219/10.55 |

Primary Examiner—J. V. Truhe
Assistant Examiner—L. H. Bender
Attorney—Stevens, Davis, Miller & Mosher ABSTRACT: Apparatus for heating or preheating a rubber article before moulding and vulcanization. The apparatus comprises a chamber, means for locating an article within the chamber in a position symmetrical within the space in the chamber, a closure member for enclosing the article in the chamber, and a wave guide for supply of microwave energy to the chamber for heating the article, the wave guide communicating with the space in the chamber via a wave guide entry in the base of the chamber, the entry being location in a position so as to establish a multimode distribution of energy in the chamber.

APPARATUS FOR HEATING ARTICLES

This invention relates to apparatus for heating articles and more particularly for heating or preheating unvulcanized rubber articles.

Apparatus for moulding and vulcanizing rubber articles, for example pneumatic types, is both complicated and expensive; it is thus desirable to produce as many tires as is possible, from a given unit of apparatus so that the shorter the time each article occupies the moulding and vulcanizing apparatus the greater the output of each unit in a given time period.

It is an object of the present invention to provide means for preheating rubber articles prior to moulding and vulcanization.

According to the present invention there is provided an apparatus for heating or preheating a rubber article prior to moulding and vulcanization comprising a chamber, means for locating an article within the chamber in a position substantially symmetrical within the space formed inside the chamber, a closure member for detachably securing to the chamber for totally enclosing an article located within the chamber and a wave guide communicating with the space formed within the chamber for the supply of microwave energy to heat or preheat the article, the wave guide entry to the chamber being located at the base of the chamber in a position so as to establish a multimode distribution of energy within the chamber in the presence of the article.

The chamber may be of circular, elliptical or otherwise smoothly curved cross section.

In the case of a chamber with a symmetrical cross section the wave guide entry is preferably located asymmetrically with respect to the longitudinal axis of symmetry of the chamber.

Preferably the chamber is provided with two planar surfaces which converge to intersect either to form a well-defined sharp corner extending longitudinally of the chamber, or to form a rounded corner again extending generally longitudinally of the chamber.

When the chamber has a corner extending longitudinally thereof the wave guide entry is preferably arranged adjacent the corner. It has been found that when a chamber of cross section equivalent to three quadrants of a circle plus a square which occupies the fourth quadrant of the circle the sides of the square having a length equal to the radius of the circle is employed, good results i.e. acceptable multimode distribution of energy, are obtained when the wave guide entry is arranged at a position in the base along the line joining the center of curvature of the circular portion of the base, and the apex of the corner of the base.

A mode stirrer, for example in the form of a rotatable four-bladed element, may be located in the chamber so that the blades, each in turn, pass across the opening to the wave guide causing a cyclic deflection of the energy transmitted by the wave guide to distribute it within the space formed inside the chamber.

A shaft may be provided inside the chamber for location coaxially within an annular article to be heated or preheated, such as an uncured pneumatic tyre. In this case the means for locating the article can be a carrier attached to the shaft. Preferably the annular article is a tire preferably suspended from the carrier by its upper bead in the case of a radial ply tire but can, if desired, be rested on the carrier on its lower bead in the case of a cross-ply tire. Means may be provided for rotating the article, for example, a pneumatic tire, during the heating or preheating operation, and/or for reciprocating it axially.

The means for reciprocation may be directly connected to the shaft which is connected to the means for locating the tire within the chamber.

The microwave energy utilized in the heating or preheating process may have a frequency of, for example, 895 MHz, 2450 MHz or approximately 10,000 MHz, these frequencies being frequencies which are available to be used without restriction, industrially, in the United Kingdom, but it will be appreciated that other frequencies of the same order, e.g. from 500 to 12,000 MHz, are also utilizable for the purpose of the invention. It will also be appreciated that the rubber referred to may be natural or synthetic rubber and is compounded with other ingredients, for example carbon black; the carbon/polymer combinations which result in such compounding have relatively high microwave heating characteristics and upon application of microwave energy, a substantial rise in temperature of the rubber composition is effected.

Figure 2:
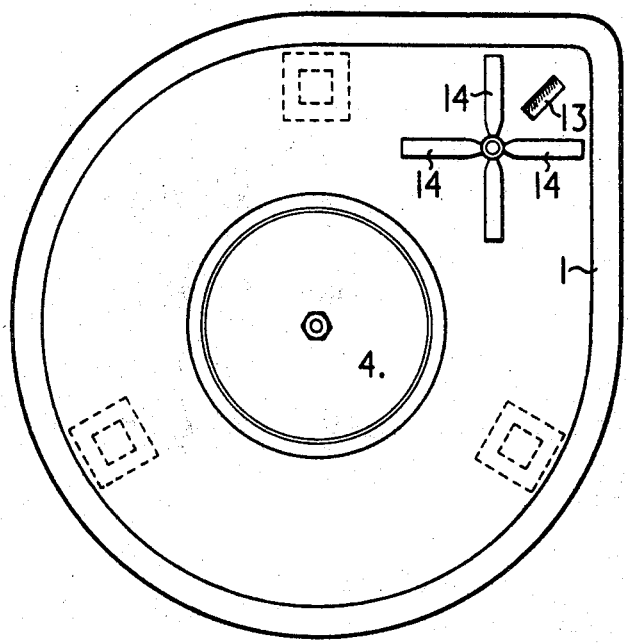

One embodiment of the invention will now be described by way of example only, with reference to the accompanying drawings in which:

FIG 1 is a side elevation of an apparatus for preheating of a pneumatic tire showing the interior of the apparatus in section; and FIG 2 is a plan view of the apparatus with the lid removed.

The apparatus consists of a chamber 1 of cross section equivalent to three quadrants of a circle, plus a square which occupies the fourth quadrant of the circle, the sides of the square having a length equal to the radius of the circle. The chamber 1 is provided with a lid 2, the chamber 1 being disposed with its axis vertically and the lid 2 being capable of being raised and lowered by means of a piston, cylinder and lever assembly 3. Suitable sealing means (not shown) to prevent the loss of microwave energy, are located on the lid 2 for sealing relationship with the rim of the chamber 1.

A supporting disc 4, for rotatably carrying an uncured pneumatic tire coaxially within the chamber, with its axis of rotation disposed vertically, is disposed within the chamber 1. The disc 4 is carried upon a shaft 5 which passes through a microwave-energy sealing device 6, the shaft 5 extending vertically from the base of the chamber 1.

A motor (not shown) is provided not only for rotating the shaft 5 by means of a pulley 7 on the shaft 5, but also for vertically reciprocating the shaft 5, reciprocation being carried out in a well-known manner, by means of the motor provided for rotating the shaft, through a gearbox 8, eccentric sheave 9, connecting rod 10 and lever 11 assembly.

At the base of the chamber 1 a wave guide 12 of rectangular cross section is connected to the base at a position adjacent to the square corner and nearer the periphery of the chamber than to its vertical axis, the wave guide conveying microwave energy from a generating device (not shown) of known form, operating at 2450 MHz, into the chamber 1 through an entry 13.

A mode stirrer is provided comprising an electric motor and gearbox (not shown) drivably connected to four vanes 14, a shaft 15 carrying the vanes 14 passing vertically through the base of the chamber 1 via a microwave-energy sealing device 16 so that the vanes 16, upon rotation, operate, one at a time, completely to sweep over the wave guide entry 13. Each of the vanes 14 is provided with a plane energy-reflecting surface disposed at approximately 45° to the direction of transmission of the microwave energy which is thus reflected from the plane surface of each of the blades.

In operation a shaped completely unvulcanized pneumatic tire of natural or synthetic rubber including compounding ingredients incorporating carbon black is located within the chamber 1, in the cold, substantially fully shaped state, around the shaft 5 and on the supporting disc 4; the lid 2 is closed so as completely to close the tire within the chamber mode-stirrer mode-stirrer motor is energized so that the vanes 14 pass over the wave tire, entry 13 one at a time. The motor for rotating and reciprocating the tire within the chamber is actuated and the microwave energy is switched on so that a multimode distribution of energy is achieved within the chamber, localized resonant areas of high energy being avoided.

The position of the wave guide entry 13, in an offset position with respect to the chamber, causes the energy to be split up by reflection from the internal chamber surfaces it being considered that this and the square corner is most important in the elimination of the high energy content of local resonances.

In addition, the mode-stirrer is effective in this manner. Moreover, the rotation and reciprocation of the pneumatic tire, although this may not be essential, is a further provision to assist in even heating throughout the tire.

After a short duration within the chamber, e.g. for a period of a few minutes, the tire can be removed and it is found that it is evenly preheated to a temperature of about 150° C. The tire can then be transferred to a conventional moulding and vulcanizing apparatus for final vulcanization, it being appreciated that less time is spent by the tire in this latter apparatus which is thus available for the manufacture of a greater number of tires in any given period of working.

We claim:

1. Apparatus for heating or preheating a rubber article prior to moulding and vulcanization comprising a chamber, means for locating an article within the chamber in a position substantially symmetrical within the space formed inside the chamber, a closure member for detachably securing to the chamber for totally enclosing an article located within the chamber and a wave guide communicating with the space formed within the chamber for the supply of microwave energy to heat or preheat the article, the wave guide entry to the chamber being located at the base of the chamber in a position so as to establish a multimode distribution of energy within the chamber in the presence of the article and the chamber being at least partly of curved cross section but having at least two planar surfaces which converge to form a corner extending generally longitudinally of the chamber.

2. Apparatus according to claim 1 in which the chamber has a symmetrical cross section and the wave guide entry to the chamber is located asymmetrically with respect to the longitudinal axis of symmetry of the chamber.

3. Apparatus according to claim 1 in which the wave guide entry to the chamber is located adjacent the corner.

4. Apparatus according to claim 1 in which the chamber has a cross section equivalent to three quadrants of a circle plus a square which occupies the fourth quadrant of the circle the sides of the square having a length equal to the radius of the circle.

5. Apparatus according to claim 4 in which the wave guide entry is located at a position in the base of the chamber along the line joining the center of curvature of the circular portion of the base and the apex of the corner of the base.

6. Apparatus according to claim 1 in which means are provided for rotating the article during heating.

7. Apparatus according to claim 1 in which means are provided for reciprocating the article during heating.

8. Apparatus according to claim 1 in which a shaft is provided in the chamber for location coaxially within an annular article to be heated or preheated.

9. Apparatus according to claim 8 in which the means for locating the annular article within the chamber is a carrier attached to the shaft.

10. Apparatus according to claim 9 in which means for rotating and/or reciprocating the annular article are connected to the shaft.

11. Apparatus according to claim 1 in which a mode-stirrer is provided at the wave guide entry into the chamber to distribute energy transmitted by the wave guide within the space formed inside the chamber.